US009119082B1

(12) United States Patent
Gomadam et al.

(10) Patent No.: US 9,119,082 B1
(45) Date of Patent: Aug. 25, 2015

(54) REFERENCE SIGNAL DESIGN FOR INTERFERENCE MEASUREMENT

(71) Applicant: Marvell International Ltd., Hamilton (BM)

(72) Inventors: Krishna Srikanth Gomadam, San Jose, CA (US); Raphael Cendrillon, Palo Alto, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 417 days.

(21) Appl. No.: 13/733,150

(22) Filed: Jan. 3, 2013

Related U.S. Application Data

(60) Provisional application No. 61/584,191, filed on Jan. 6, 2012.

(51) Int. Cl.
| | | |
|---|---|---|
| H04B 1/28 | (2006.01) | |
| H04W 48/20 | (2009.01) | |
| H04W 24/02 | (2009.01) | |

(52) U.S. Cl.
CPC ... *H04W 24/02* (2013.01); *H04B 1/28* (2013.01)

(58) Field of Classification Search
CPC .............. H04B 1/28; H04B 1/30; H04B 1/04; H04B 3/54; H04B 7/2643; H04W 72/082; H04W 16/10; H04W 36/00; H04W 48/16; H04W 48/20; H04W 72/085
USPC ......................................................... 455/501
See application file for complete search history.

(56) References Cited

U.S. PATENT DOCUMENTS

| | | |
|---|---|---|
| 2009/0268630 A1 | 10/2009 | Yellin et al. |
| 2010/0303034 A1 | 12/2010 | Chen et al. |
| 2010/0322171 A1 | 12/2010 | Dekorsy et al. |
| 2010/0322227 A1* | 12/2010 | Luo ............................... 370/345 |
| 2010/0322351 A1 | 12/2010 | Tang et al. |
| 2011/0032838 A1 | 2/2011 | Liu et al. |
| 2011/0034175 A1 | 2/2011 | Fong et al. |
| 2011/0176634 A1* | 7/2011 | Yoon et al. ..................... 375/295 |
| 2011/0268007 A1 | 11/2011 | Barany et al. |
| 2013/0114430 A1* | 5/2013 | Koivisto et al. ................ 370/252 |
| 2013/0136100 A1* | 5/2013 | Yoon et al. ..................... 370/330 |

(Continued)

FOREIGN PATENT DOCUMENTS

| | | |
|---|---|---|
| WO | 2011021852 A2 | 2/2011 |
| WO | 2011097523 A1 | 8/2011 |

(Continued)

OTHER PUBLICATIONS

International Application PCT/IB2012/057248 Search Report dated May 8, 2013.

(Continued)

*Primary Examiner* — Bobbak Safaipour

(57) ABSTRACT

A method includes, in a mobile communication terminal, receiving signals from a group of cells in multiple time-frequency Resource Elements (REs). The signals include a desired signal component and an interfering signal component. A subset of the REs, in which the cells are known deterministically to transmit at least part of the interfering signal component and to not transmit the desired signal component, is identified in the terminal. An interference caused by the interfering signal component to the desired signal component is estimated in the terminal, by measuring the signals in the REs in the subset.

20 Claims, 2 Drawing Sheets

(56) References Cited

U.S. PATENT DOCUMENTS

| | | | |
|---|---|---|---|
| 2013/0223258 A1* | 8/2013 | Seo et al. | 370/252 |
| 2014/0056156 A1* | 2/2014 | Jongren | 370/252 |
| 2014/0057670 A1* | 2/2014 | Lim et al. | 455/509 |
| 2015/0003269 A1* | 1/2015 | Chun et al. | 370/252 |

FOREIGN PATENT DOCUMENTS

| | | |
|---|---|---|
| WO | 2011114079 A1 | 9/2011 |
| WO | 2011119140 A2 | 9/2011 |

OTHER PUBLICATIONS

International Application PCT/IB2012/057455 Search Report dated May 13, 2013.

3GPP TR 36.819, "Technical Specification Group Radio Access Network; Coordinated Multi-Point Operation for LTE Physical Layer Aspects", Release 11, Version 11.0.0, 68 pages, Sep. 2011.

Gomadam et al., U.S. Appl. No. 13/610,908 filed on Sep. 12, 2012.

Gomadam, S. K., U.S. Appl. No. 13/719,241 filed on Dec. 19, 2012.

Zhang et al., U.S. Appl. No. 61/558,405 filed on Nov. 10, 2011.

3GPP TS 36.211, "Technical Specification Group Radio Access Network; Evolved Universal Terrestrial Radio Access (E-UTRA); Physical Channels and Modulation (release 10)", V10.3.0, 103 pages, Sep. 2011.

3GPP TS 36.212, "Technical Specification Group Radio Access Network; Evolved Universal Terrestrial Radio Access (E-UTRA); Multiplexing and channel coding (release 10)", V10.3.0, 79 pages, Sep. 2011.

* cited by examiner

REFERENCE SIGNAL DESIGN FOR INTERFERENCE MEASUREMENT

CROSS-REFERENCE TO RELATED APPLICATIONS

This application claims the benefit of U.S. Provisional Patent Application 61/584,191, filed Jan. 6, 2012, whose disclosure is incorporated herein by reference.

FIELD OF THE DISCLOSURE

The present disclosure relates generally to communication systems, and particularly to methods and systems for interference estimation in receivers.

BACKGROUND

In some Multiple-Input Multiple-Output (MIMO) communication systems. multiple cells use Cooperative Multipoint (CoMP) transmission schemes for coordinating downlink MIMO transmissions to User Equipment (UEs). Third Generation Partnership Project (3GPP) Long Term Evolution-Advanced (LTE-A) systems, for example, use or contemplate the use of multiple CoMP modes such as Dynamic Point Selection (DPS), Dynamic Point Blanking (DPB), Cooperative beamforming (CB) and Joint Transmission (JT).

The CoMP modes used in LTE-A are specified, for example, in "3rd Generation Partnership Project; Technical Specification Group Radio Access Network; Coordinated multi-point operation for LTE physical layer aspects (Release 11)," 3GPP TR 36.819, version 11.0.0, September, 2011, which is incorporated herein by reference. When using CoMP, the cooperating cells typically configure their transmissions based on channel feedback provided by the UEs.

Feedback in communication systems is sometimes calculated based on interference measurements performed by the UEs. Various interference measurements techniques are known in the art. For example, U.S. Patent Application Publication 2009/0268630, whose disclosure is incorporated herein by reference, describes a user device on a wireless network that includes a receiver, a noise detector and a noise determiner. The receiver receives downlink data communications from a base station that indicates an allocation of time/frequency resource blocks at least to user devices that are communicating with the base station. The noise detector measures noise in a time/frequency resource block, comprising plural time/frequency bins, that is not allocated to one of the user devices (e.g., allocated to a virtual user device). The noise determiner determines a level of interfering noise based on noise in the resource block that is not allocated to one of the user devices.

The description above is presented as a general overview of related art in this field and should not be construed as an admission that any of the information it contains constitutes prior art against the present patent application.

SUMMARY

An embodiment that is described herein provides a method including, in a mobile communication terminal, receiving signals from a group of cells in multiple time-frequency Resource Elements (REs). The signals include a desired signal component and an interfering signal component. A subset of the REs, in which the cells are known deterministically to transmit at least part of the interfering signal component and to not transmit the desired signal component, is identified in the terminal. An interference caused by the interfering signal component to the desired signal component is estimated in the terminal, by measuring the signals in the REs in the subset.

In some embodiments, receiving the signals includes receiving Coordinated Multipoint (CoMP) transmissions in accordance with a CoMP scheme coordinated among the cells in the group. In an embodiment, receiving the signal includes receiving a first Channel-State-information Reference Signal (CSI-RS) associated with the desired signal component and a second Channel-State-Information Reference Signal (CSI-RS) associated with the interfering signal component. In an example embodiment, identifying the subset includes identifying one or more zero-power REs in which the first CSI-RS is not transmitted and the interfering signal component is transmitted.

In another embodiment, the method includes receiving an instruction whether to measure the interference using the REs in the subset or using Common Reference Signals (CRS). In yet another embodiment, estimating the interference includes measuring the signals in the REs in the subset that are known to have a statistical distribution of a data channel.

In still another embodiment, identifying the subset includes identifying an additional subset of the REs in which the cells are known to transmit the desired signal component, and the method includes estimating a response of a communication channel between the terminal and one or more of the cells by measuring the signals in the additional subset of the REs. In an example embodiment, identifying the subset includes identifying an allocation of the REs in the subset with a first density in time and frequency, and identifying an assignment of the REs in the additional subset with a second density that is sparser than the first density.

In a disclosed embodiment, the method includes receiving a definition of a time-frequency averaging window, and estimating the interference includes averaging the estimated interference over the time-frequency averaging window. In another embodiment, the method includes applying the estimated interference both for computing Channel Quality Indicator (CQI) reported to the cells and for demodulating the desired signal component. In yet another embodiment, the method includes applying the estimated interference for computing Channel Quality Indicator (CQI) reported to the cells, and applying alternative interference estimation for demodulating the desired signal component. In some embodiments, identifying the subset includes receiving from the cells signaling information that is indicative of the subset.

There is additionally provided, in accordance with an embodiment that is described herein, apparatus including a receiver and processing circuitry. The receiver is configured to receive signals from a group of cells in multiple time-frequency Resource Elements (REs), the signals including a desired signal component and an interfering signal component, to identify a subset of the REs in which the cells are known deterministically to transmit at least part of the interfering signal component and to not transmit the desired signal component. The processing circuitry is configured to estimate an interference caused by the interfering signal component to the desired signal component, by measuring the signals in the REs in the subset.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Figure 1:
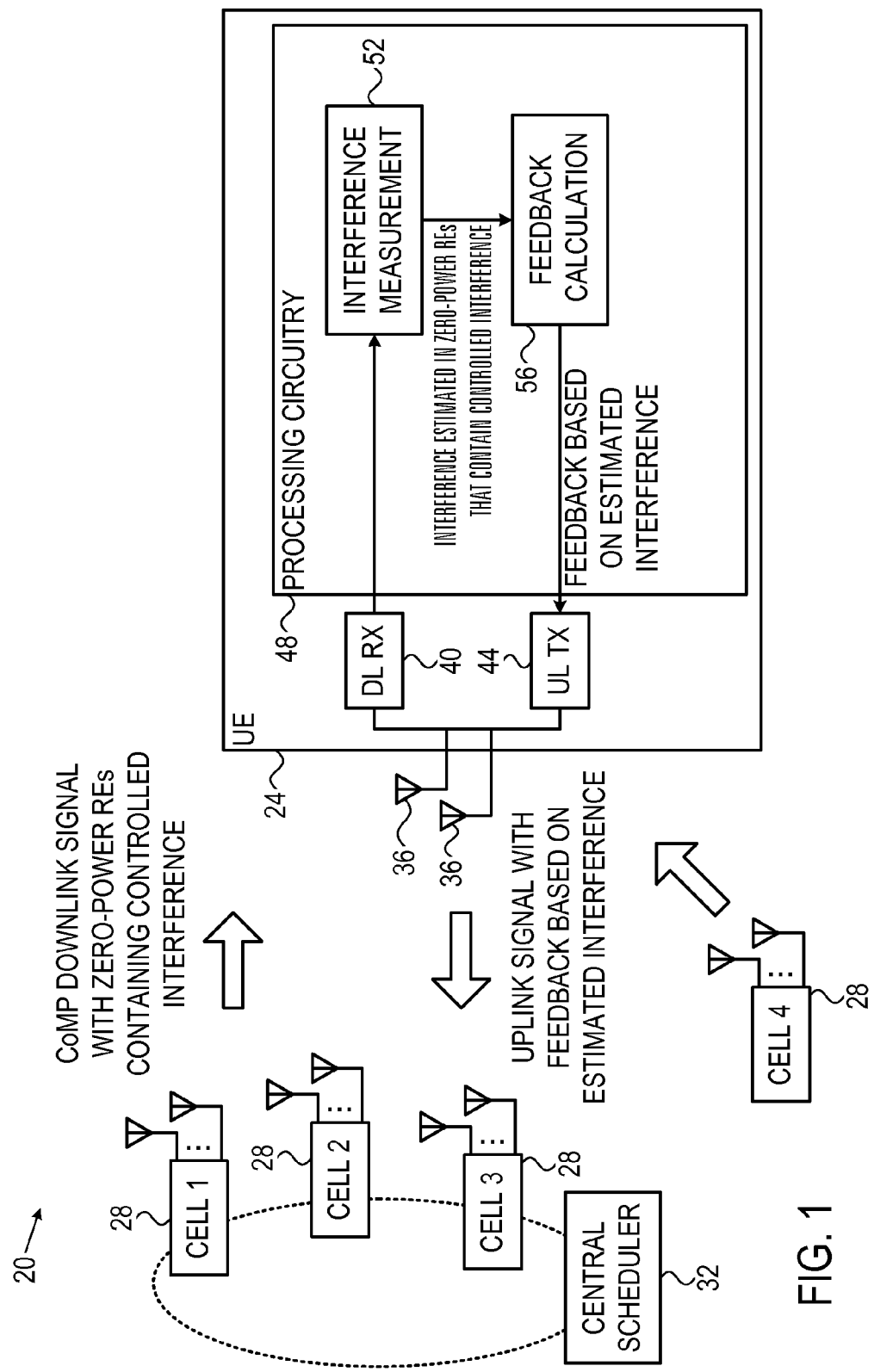
FIG. 1 is a block diagram that schematically illustrates a MIMO communication system that uses CoMP, in accordance with an embodiment that is described herein.

In a typical CoMP system, multiple cooperating cells transmit downlink MIMO signals to mobile communication terminals in coordination. Various forms of cooperation are possible, e.g., coordinating beamforming and scheduling decisions among the cells, or even transmitting a joint signal carrying the same data to a terminal from multiple cells.

The cells, or a central scheduler, configure the downlink signals based on channel feedback that is provided by the terminals. Some forms of feedback, such as Channel Quality Indicator (CQI) feedback, depend on interference measurements performed in the terminals. Interference estimation is also used in the terminals, for example, for signal demodulation.

Embodiments that are described herein provide improved methods and systems for estimating interference in mobile communication terminals. Although the embodiments described herein refer mainly to LTE-A systems that use CoMP, the disclosed techniques are useful for estimating interference in various other system configurations.

In the disclosed embodiments, a communication system comprises a mobile communication terminal that receives signals from a group of cells in multiple time-frequency Resource Elements (REs). The signals comprise a desired signal component, which is addressed to the terminal, and an interfering signal component, e.g., transmissions from the cells to other terminals. The terminal estimates the level of interference, for example in order to provide feedback to the cells and/or demodulate the desired signal component.

In some embodiments, the system dedicates a subset of the time-frequency REs for interference measurement by the terminal. The cells typically send to the terminal signaling information that indicates which REs are to be used for interference measurement, and the terminal estimates the interference by measuring the signals in these REs. In the REs in the dedicated subset, the cooperating cells do not transmit the desired signal, and therefore any signal received in these REs is regarded by the terminal as interference.

Moreover, by virtue of the cooperation among the cells, the system ensures that the REs in the subset will contain at least some of the undesired signal components. In an example embodiment, the cells transmit in these REs a signal that is statistically similar to a data channel. As a result, the interference estimated by the terminal is very close to the actual interference that the terminal will experience during data reception. As a result, CQI feedback and/or signal demodulation can be performed with high accuracy.

It is possible in principle for the terminal to simply estimate the interference in REs that do not contain the desired signal component, without deterministic knowledge that interference is present in these REs. This sort of estimation, however, is often inaccurate and requires long averaging times, because the interfering signals are highly unpredictable and not controlled. In the disclosed techniques, in contrast, the system proactively ensures that the interference-measurement REs will deterministically contain interference, typically with controlled statistical characteristics. As a result, interference estimation accuracy in the terminal can be improved and estimation time can be reduced.

FIG. 1 is a block diagram that schematically illustrates a Cooperative Multipoint (CoMP) communication system 20, in accordance with an embodiment that is described herein. In the present example, system 20 operates in accordance with the Third Generation Partnership Project (3GPP) Long Term Evolution-Advanced (LTE-A) specifications. In alternative embodiments, system 20 may operate in accordance with any other suitable communication protocol in which cells coordinate transmission with one another, such as, for example, WiMAX.

In the embodiment of FIG. 1, system 20 comprises a mobile communication terminal 24 (referred to in LTE-A terminology as User Equipment—UE) and three cells 28 (base stations) denoted CELL1, CELL2 and CELL3. The terms cell, base station and Transmission Point (TP) are used interchangeably herein. The choice of a single UE and three cells is made purely by way of example. In real-life configurations, system 20 typically comprises a large number of cells, some of which may be collocated, and a large number of terminals. Each UE 24 comprises, for example, a cellular phone, a wireless-enabled computing device or any other suitable type of communication terminal.

Cells 28 cooperate with one another in transmitting precoded (i.e., beamformed) signals to UEs 24. Depending on the CoMP mode or on other factors, the cells may cooperate in beamforming, beam activation and deactivation, transmission scheduling or other tasks. A group of cells that cooperate in this manner, such as CELL1, CELL2 and CELL3, is referred to as a cooperating set. In various embodiments, cells 28 may use CoMP modes such as DPS, DPB, JT, CB, and possibly alternate between different modes over time. In many real-life scenarios, UE 24 also receives signals from one or more cells 28 that do not belong to the cooperating set, such as the cell denoted CELL4 in the figure. Such signals are typically regarded as interference.

In the present embodiment, system 20 comprises a central scheduler 32, which schedules the transmissions of the various cells to the various UEs, and calculates precoding vectors (i.e., sets of complex weights to be applied to the signals transmitted via the respective transmit antennas of the cells) to be applied by the cells when transmitting the CoMP transmissions, in an embodiment. In some embodiments the central scheduler also selects the appropriate CoMP mode, and the cell or cells in the set that will transmit to a UE.

Central scheduler 32 typically selects the CoMP mode, the transmitting cell or cells, and/or the precoding vectors, based on channel feedback that is received from the UEs. In some embodiments, the UEs calculate the feedback based on interference estimation, as will be explained in detail further below. In some embodiments the interference estimation is also used for demodulating the signals transmitted to the terminals.

In the embodiment of FIG. 1, UE 24 comprises one or more antennas 36, a downlink receiver (DL RX) 40, an uplink transmitter (UL TX) 44, and processing circuitry 48. Receiver 40 receives downlink signals from cells 28 via antennas 36. Processing circuitry 48 processes the received signals. Among other tasks, processing circuitry 48 calculates the channel feedback for various communication channels over which downlink signals are transmitted to the UE, and formats the feedback information to be transmitted to cells 28. Processing circuitry 48 provides the feedback information to uplink transmitter 44, which transmits the feedback information to cells 28.

In the present embodiment, processing circuitry 48 comprises an interference measurement module 52, which estimates the interference caused by undesired signal components, using techniques that are described in detail below. A feedback calculation module 56 calculates channel feedback, e.g., CQI feedback, based on the estimated interference.

The UE configuration seen in FIG. 1 is an example configuration, which is depicted in a highly simplified manner solely for the sake of clarity. In alternative embodiments, any other suitable UE configuration can be used. UE elements that are not mandatory for understanding of the disclosed techniques have been omitted from the figure for the sake of clarity.

In various embodiments, some or all of the elements of UE 24, including receiver 40, transmitter 44 and processing circuitry 48, are implemented in hardware, such as implementing receiver 40 and/or transmitter 44 using one or more Radio Frequency Integrated Circuits (RFICs), or implementing processing circuitry 48 using one or more Field-Programmable Gate Arrays (FPGAs) or Application-Specific Integrated Circuits (ASICs). In alternative embodiments, various elements of UE 24 are implemented in software, or using a combination of hardware and software elements.

In some embodiments, various UE elements, such as various elements of processing circuitry 48, are implemented in a programmable processor, which is programmed in software to carry out the functions described herein. The software may be downloaded to the processor, in whole or in part, in electronic form, over a network, for example, or it may, alternatively or additionally, be provided and/or stored on non-transitory tangible media, such as magnetic, optical, or electronic memory.

In some embodiments, each Transmission Point (TP) in the group of cooperating cells transmits respective different reference signals, referred to as Channel State Information Reference Signals (CSI-RS). Each cell 28 is thus also referred to as a CSI-RS resource. The CSI-RS are typically assigned a specific pattern of time-frequency REs in the downlink signal. In an embodiment, some of the REs dedicated for CSI-RS (CSI-RS resource) contain zero-power CSI-RS. In these REs, the TP associated with the CSI-RS in question is silent.

Figure 2:
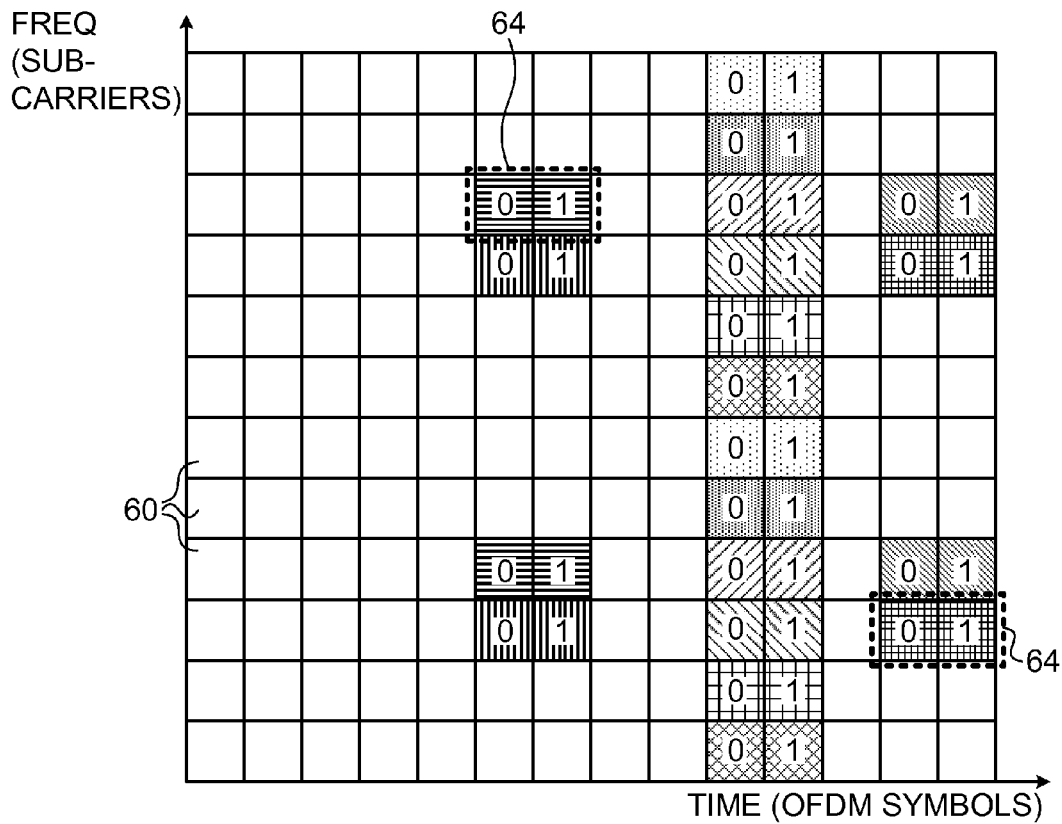
FIG. 2 is a diagram showing an allocation of time-frequency Resource Elements (REs) in a MIMO communication system that uses CoMP, in accordance with an embodiment that is described herein.

FIG. 2 is a diagram showing an allocation of time-frequency REs 60 in system 20, in accordance with an embodiment that is described herein. The example of FIG. 2 shows a pair of Physical Resource Blocks (PRBs). The PRB pair comprises fourteen Orthogonal Frequency Division Multiplexing (OFDM) symbols in the time domain, each OFDM symbol spanning twelve sub-carriers in the frequency domain. This structure of PRBs is typically repeated periodically over time and frequency.

Some of REs 60 are assigned for transmitting CSI-RS resources. These REs—a total of forty REs in the present example—are hashed in the figure. In the example of FIG. 2, each CSI-RS resource is assigned at least a pair of REs 60 that are adjacent in time. The twenty possible pairs of REs are marked with various hatching patterns in the figure. In an example embodiment, a CSI-RS resource is assigned a total of four REs marked 64. This choice of REs provides the maximal diversity in time and frequency, and thus the best achievable channel response or interference estimation accuracy.

The example of FIG. 2 refers to a case of two antenna ports denoted "0" and "1", and an assignment of two REs per port per PRB pair. In each pair of REs, one RE is assigned to antenna port "0" and the other to antenna port "1"—The REs in the figure are marked with their assigned port numbers. The signaling information from the cells typically informs the terminal of the assigned pattern.

In some embodiments, scheduler 32 assigns one or more of the CSI-RS resources (pairs of hatched adjacent REs in FIG. 2) for interference estimation in terminal 24, and one or more other CSI-RS resources for channel response measurements in terminal 24. Typically although not necessarily, the allocation of interference-measurement CSI-RS resources is more dense (i.e., comprises more REs) than the allocation of channel-estimation CSI-RS resources.

Cells 28 typically transmit to the terminal signaling information, which is indicative of the interference-measurement and channel-estimation CSI-RS resource assignment. Processing circuitry 48 receives the signaling information and performs interference and channel estimation by measuring the received signal in the appropriate REs.

Consider a subset of REs 60 that are allocated for interference measurement. In these REs, cells 28 (under control of scheduler 32) do not transmit the desired signal component to the terminal. These REs are therefore referred to as zero-power CSI-RS resources. Moreover, scheduler 32 ensures deterministically that the REs in the subset will contain at least part of the interfering signal component.

In an example embodiment, scheduler 32 identifies one or more dominant interfering cells, and controls these cells to transmit the interfering signals in the REs in the subset. Moreover, in some embodiments scheduler 32 controls the interfering cells to transmit a genuine Physical Data Shared Channel (PDSCH) signal, or at least a signal that is statistically similar to a PDSCH signal, in the REs in the subset. This sort of control ensures that the interference measured by terminal 24 in the REs in the subset will be similar to the actual interference that will be experienced during PDSCH reception.

In an embodiment, DL RX 40 receives the signals in the REs in the subset (in the zero-power CSI-RS resources in which interference is deterministically transmitted). Interference measurement module 52 estimates the interference by measuring the signals in these REs. Since the REs in the subset are known deterministically to contain interference and not contain the desired signal, the interference estimation is highly accurate and can be performed over relatively short averaging times.

In an embodiment, module 52 accumulates the signal measurements obtained from the time-frequency REs in the subset, and calculates the signal covariance as follows. The signal measured in the RE of frequency f and time t can be written as:

$$y(f, t) = \sum_{i \in I} H_i(f, t) x_i(f, t) + n(f, t) \qquad \text{Equation 1}$$

wherein I denotes the set of dominant interfering cells, $H_i(f, t)$ denotes the channel response between the $i^{th}$ interfering cell and the terminal, $x_i(f, t)$ denotes the signal transmitted by the $i^{th}$ interfering cell, and n(f, t) denotes a component representing noise and interference outside the cooperating group of cells.

In this embodiment, module 52 estimates the interference covariance directly by calculating:

$$K(f, t) = \sum_{\substack{m \in F(f) \\ n \in T(t)}} y(m, n) y^*(m, n) \qquad \text{Equation 2}$$

wherein F(f) denotes a frequency window centered around f, and T(t) denotes a time window centered around t. In some embodiments the sizes of windows F(f) and T f) are configured by cells 28 or scheduler 32. In other embodiments, the sizes of windows F(f) and T(t) are set by the terminal. In alternative embodiments, module 52 may estimate the interference using any other suitable method.

The following table gives several examples of CSI-RS resource configurations for interference measurement. In all the examples, the frequency periodicity is between 1-10 RBs and the time periodicity is between 1-10 mS:

TABLE I

Examples of CSI-RS resources for interference measurement

| CSI-RS resource configuration | # of antenna ports | RE density (REs per PRB pair) | # of choices |
|---|---|---|---|
| 1 | 1 | 1 | 40 |
| 2 | 1 | 2 | 20 |
| 3 | 2 | 1 | 20 |
| 4 | 2 | 2 | 10 |

In alternative embodiments, system 20 may use any other suitable CSI-RS resource configuration.

Figure 3:
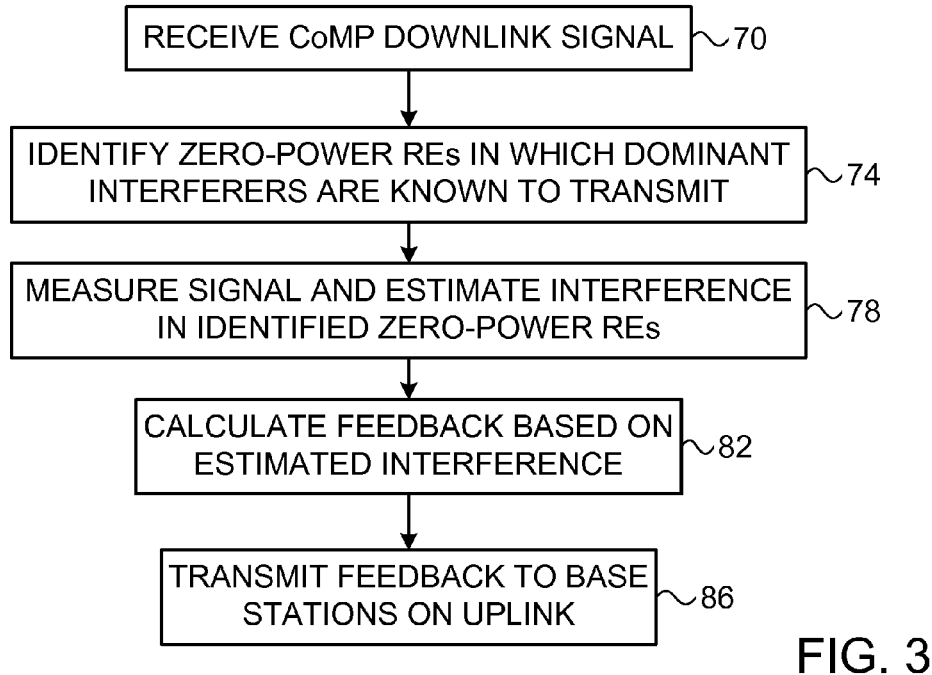
FIG. 3 is a flow chart that schematically illustrates a method for channel feedback in a MIMO communication system that uses CoMP, in accordance with an embodiment that is described herein.

FIG. 3 is a flow chart that schematically illustrates a method for channel feedback in system 20, in accordance with an embodiment that is described herein. The method begins with terminal 24 receiving a CoMP downlink signal, at a reception operation 70. DL RX 40 receives the signal and provides it to circuitry 48 for processing.

Processing circuitry 48 identifies the subset of zero-power CSI-RS resources assigned for interference estimation, at a subset identification operation 74. In other words, the processing circuitry identifies the pattern of REs in which the desired signal component is known to be absent, and in which at least some of the interference is known deterministically (not statistically) to be present. In the embodiments described herein, processing circuitry 48 receives from cells 28 signaling information that is indicative of the subset of REs. Alternatively, however, processing circuitry may identify the interference-measurement REs in any other suitable way.

Interference measurement module 52 estimates the level of interference by measuring the signal in the REs in the subset, at an interference estimation operation 78. In an example embodiment, module 52 estimates the interference in accordance with Equations 1 and 2 above.

Feedback calculation module 56 calculates channel feedback, for example CQI, based on the estimated interference, at a feedback calculation operation 82. UL TX 44 transmits the feedback over an uplink channel to cells 28, at a feedback transmission operation 86.

In some embodiments, terminal 24 receives from cells 28 an instruction whether to estimate the interference based on zero-power CSI-RS resources as explained above, or using non-cell-specific Common Reference Signals (CRS) transmitted by the cells. In an embodiment, this instruction is transmitted to the terminal in a Measurement Type Indicator (MTI) configuration specified in the LTE-A specifications. If the MTI configuration specifies interference measurement using zero-power CSI-RS resources, the appropriate sizes for the time and frequency windows (F(f) and T(t) of Equation 2 above) may also be signaled to the terminal.

In some embodiments, processing circuitry 48 uses the interference estimation based on zero-power CSI-RS resources both for calculating CQI feedback and for demodulating the desired signal (e.g., PDSCH demodulation). In alternative embodiments, the processing circuitry uses the interference estimation based on zero-power CSI-RS resources only for CQI calculation, and uses an alternative interference estimation scheme for PDSCH demodulation. The alternative interference estimation scheme may comprise, for example, calculation of the received signal covariance, or any other suitable scheme.

In various embodiments, feedback calculation module 56 may report the estimated interference level in different ways. In an example embodiment, cells 28 set a reference signal such as a zero-power CSI-RS, and module 56 of terminal 24 reports how the interference or CQI changes when the interference is measured on this reference signal.

In some embodiments, terminal 24 feeds back a scalar value denoted $\alpha$, which indicates the difference in interference level:

$$\alpha = \frac{\text{trace}(K_{UE})}{\text{trace}(K_{reference})} \qquad \text{Equation 3}$$

wherein $K_{UE}$ denotes the interference covariance used for CQI computation, and $K_{reference}$ denotes the interference covariance based on the reference signals. In these embodiments, two or three bits are typically sufficient for the feedback of $\alpha$. In another embodiment, module 56 feeds back the difference in CQI that occurs when the reference interference is used.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a mobile communication terminal, receiving signals from a group of cells in multiple time-frequency Resource Elements (REs), wherein the signals comprise a desired signal component and an interfering signal component;
   identifying in the terminal a subset of the REs, in which the cells are known deterministically to transmit at least part of the interfering signal component and to not transmit the desired signal component; and
   estimating in the terminal an interference caused by the interfering signal component to the desired signal component, by measuring the signals in the REs in the subset.

2. The method according to claim 1, wherein receiving the signals comprises receiving Coordinated Multipoint (CoMP)

transmissions in accordance with a CoMP scheme coordinated among the cells in the group.

3. The method according to claim 1, wherein receiving the signal comprises receiving a first Channel-State-Information Reference Signal (CSI-RS) associated with the desired signal component and a second Channel-State-Information Reference Signal (CSI-RS) associated with the interfering signal component.

4. The method according to claim 3, wherein identifying the subset comprises identifying one or more zero-power REs in which the first CSI-RS is not transmitted and the interfering signal component is transmitted.

5. The method according to claim 1, comprising receiving an instruction whether to measure the interference using the REs in the subset or using Common Reference Signals (CRS).

6. The method according to claim 1, wherein estimating the interference comprises measuring the signals in the REs in the subset that are known to have a statistical distribution of a data channel.

7. The method according to claim 1, wherein identifying the subset comprises identifying an additional subset of the REs in which the cells are known to transmit the desired signal component, and comprising estimating a response of a communication channel between the terminal and one or more of the cells by measuring the signals in the additional subset of the REs.

8. The method according to claim 7, wherein identifying the subset comprises identifying an allocation of the REs in the subset with a first density in time and frequency, and identifying an assignment of the REs in the additional subset with a second density that is sparser than the first density.

9. The method according to claim 1, comprising receiving a definition of a time-frequency averaging window, wherein estimating the interference comprises averaging the estimated interference over the time-frequency averaging window.

10. The method according to claim 1, comprising applying the estimated interference both for computing Channel Quality indicator (CQI) reported to the cells and for demodulating the desired signal component.

11. The method according to claim 1, comprising applying the estimated interference for computing Channel Quality Indicator (CQI) reported to the cells, and applying an alternative interference estimation for demodulating the desired signal component.

12. The method according to claim 1, wherein identifying the subset comprises receiving from the cells signaling information that is indicative of the subset.

13. Apparatus, comprising:
a receiver, which is configured to receive signals from a group of cells in multiple time-frequency Resource Elements (REs), wherein the signals comprise a desired signal component and an interfering signal component, to identify a subset of the REs in which the cells are known deterministically to transmit at least part of the interfering signal component and to not transmit the desired signal component; and
processing circuitry, which is configured to estimate an interference caused by the interfering signal component to the desired signal component, by measuring the signals in the REs in the subset.

14. The apparatus according to claim 13, wherein the receiver is configured to receive the signals by receiving Coordinated Multipoint (CoMP) transmissions in accordance with a CoMP scheme coordinated among the cells in the group.

15. The apparatus according to claim 13, wherein the receiver is configured to receive a first Channel-State-Information Reference Signal (CSI-RS) associated with the desired signal component and a second Channel-State-Information Reference Signal (CSI-RS) associated with the interfering signal component.

16. The apparatus according to claim 13, wherein the processing circuitry is configured to measure the signals in the REs in the subset that are known to have a statistical distribution of a data channel.

17. The apparatus according to claim 13, wherein the processing circuitry is configured to receive a definition of a time-frequency averaging window, and to estimate the interference by averaging the estimated interference over the time-frequency averaging window.

18. The apparatus according to claim 13, wherein the processing circuitry is configured to identify the subset by receiving from the cells signaling information that is indicative of the subset.

19. A mobile communication terminal comprising the apparatus of claim 13.

20. A chipset for processing signals in a mobile communication terminal, comprising the apparatus of claim 13.

* * * * *